United States Patent [19]

Cable et al.

[11] 3,810,487

[45] May 14, 1974

[54] MOBILE LUBRICATION APPARATUS

[75] Inventors: Russell D. Cable, Flora; Homer K. Brenneman, Delphi, both of Ind.

[73] Assignee: Porta Service, Inc., Lafayette, Ind.

[22] Filed: Nov. 22, 1971

[21] Appl. No.: 200,973

[52] U.S. Cl............ 137/351, 137/355.12, 184/1.5, 296/24
[51] Int. Cl................................................. B60p 3/24
[58] Field of Search ...... 137/344, 351, 354, 355.12, 137/355.16, 234.6; 184/1.5; 296/24, 153; 239/172

[56] References Cited
UNITED STATES PATENTS

| | | | |
|---|---|---|---|
| 2,498,229 | 2/1950 | Adler | 137/234.6 X |
| 3,308,845 | 3/1967 | Bellas et al. | 137/234.6 |
| 2,479,139 | 8/1949 | Seigel | 184/1.5 |
| 2,765,938 | 10/1956 | Di Addezio | 296/24 R UX |
| 2,506,412 | 5/1950 | Chausse | 137/351 X |
| 2,820,528 | 1/1958 | Harper | 184/1.5 |
| 2,376,874 | 5/1945 | Henry | 184/1.5 X |
| 3,029,898 | 4/1962 | Fraser | 184/1.5 |
| 2,869,919 | 1/1959 | Von Seggern | 296/24 R |
| 3,648,720 | 3/1972 | Kornahrens | 137/351 |
| 1,829,173 | 10/1931 | Wertz | 184/1.5 |
| 3,095,062 | 6/1963 | Neely | 184/1.5 |
| 3,513,941 | 5/1970 | Becnel | 184/1.5 |

*Primary Examiner*—Alan Cohan
*Assistant Examiner*—Gerald A. Michalsky
*Attorney, Agent, or Firm*—Woodard, Weikart, Emhardt & Naughton

[57] ABSTRACT

A mobile lubrication apparatus having a van truck with storage tanks mounted therein connected to pressure hoses. A pair of hose assemblies are mounted adjacent to the rear door of the truck with each assembly having four rotatably mounted reels with a hose wrapped around each reel. The hoses are extendable from the truck so as to allow lubrication of another vehicle. A row of tanks is mounted to the truck platform adjacent each one of the two side walls of the truck. The tanks adjacent one side wall are spaced from the tanks mounted adjacent the other side wall forming a walkway and a storage area therebetween. One row of tanks has a pair of engine oil tanks and a water/anti-freeze tank. The other row of tanks has a chassis lubrication tank, a transmission oil tank and a waste oil receiving tank. A generator is mounted within the truck being operably driven by the truck transmission and providing electrical energy to operate an air compressor mounted atop an air storage tank. Air pressure pumps are mounted atop the tanks being operable by the pressurized air provided by the air compressor to force the contents of the tanks out through the hoses of the hose assemblies. A waste oil receiver may be positioned under the vehicle being lubricated to receive waste oil and is connected to a suction hose which conveys the waste oil back to a storage tank within the truck. Another suction hose is provided so as to allow use of the customer's oil in lieu of the oil stored in the truck. Power outlets and a desk are mounted to the rear doors of the truck.

2 Claims, 9 Drawing Figures

INVENTORS
RUSSELL D CABLE
HOMER K. BRENNEMAN
BY Woodard, Weikart, Emhardt & Naughton
ATTORNEYS INVENTORS
RUSSELL D CABLE
HOMER K. BRENNEMAN
BY
Woodard, Weikart, Emhardt & Naughton
ATTORNEYS

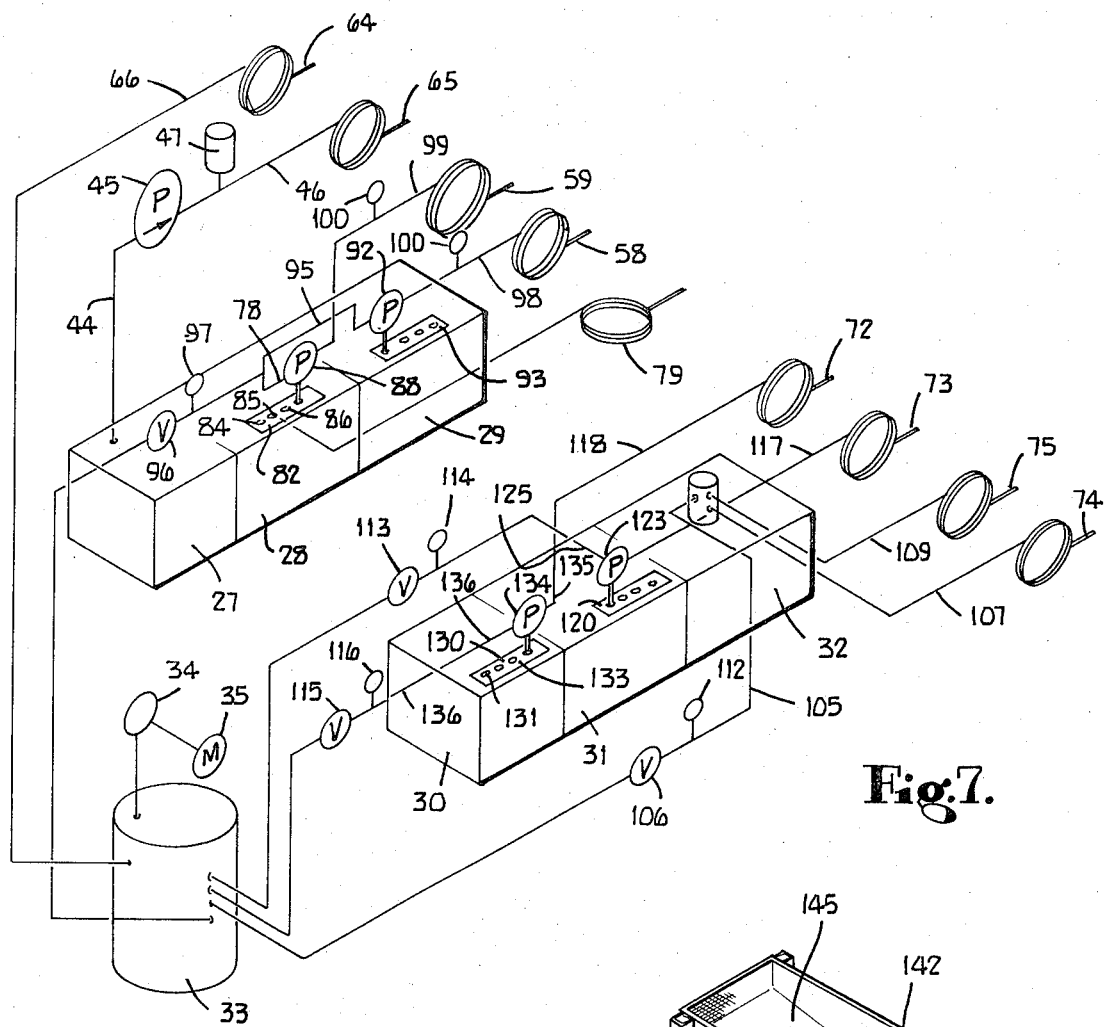

MOBILE LUBRICATION APPARATUS

BACKGROUND OF THE INVENTION

1. Field of the Invention: This invention is in the field of lubricating systems; more specifically, mobile lubricating systems.

2. Description of the Prior Art: A representative sample of the prior art is disclosed in the following U.S. patents:

U.S. Pat. No. 1,829,173 issued to Wertz;
U.S. Pat. No. 2,425,848 issued to Vawter;
U.S. Pat. No. 2,603,312 issued to Tabert;
U.S. Pat. No. 3,196,982 issued to Dinkelkamp;
U.S. Pat. No. 3,216,527 issued to Lewis; and,
U.S. Pat. No. 3,430,730 issued to Kitajima.

None of these devices disclose a mobile lubrication apparatus which has the capability to provide a measured amount of oil to the vehicle being lubricated with the oil being taken from either storage tanks within the apparatus or from remote oil storage tanks. Thus, the apparatus allows use of the customer's oil or the oil contained within the lubricating apparatus. The arrangement of the various tanks within the truck is new providing for a walkway between the tanks and a capability heretofore unknown. For example, the apparatus includes a chassis lubrication capability, a transmission oil lubrication capability as well as pressurized air to fill the vehicle's tires and water/antifreeze for the vehicle's cooling system.

A serpentine shaped pipe is fixedly mounted to the bottom walls of all of the tanks and is connected to the vehicle radiator receiving the circulating heated fluid within the radiator. Thus, the bottom walls of the tanks are heated preventing the viscosity of the fluid within the tanks to significantly increase in winter time operations.

SUMMARY OF THE INVENTION

One embodiment of the present invention is a mobile lubrication system combination of a truck, a first row of storage tanks mounted to the truck and extending along one side thereof, one of the tanks having an outlet tube, a second row of storage tanks mounted to the truck and extending along the opposite side thereof and being spaced from said first row of tanks with a storage area and a walkway therebetween, a first reel assembly mounted to the truck and having a plurality of reels rotatably mounted thereon, a first hose mounted to a reel of the assembly and being extendable from the truck, a suction hose extendable from the truck, a fluid pump mounted to the truck and having an outlet connected to the first hose and an inlet removably connected to the suction hose for the pump to force fluid from the suction hose and out the first hose, the pump inlet being connectable to the tank outlet tube when the pump is not connected to the suction hose so as to force fluid from the tank outlet tube out the first hose, and a second hose connected to a tank in the second row of tanks and being extendable from the truck.

It is an object of the present invention to provide a lubrication system which is housed within a truck which will allow for the quick and easy lubrication of another vehicle.

It is an additional object of the present invention to provide a mobile lubrication system having a capability to use the oils stored within the system or provided by the customer.

Yet another object of the present invention is to provide a mobile lubrication system having means to withdraw and store waste oils from the vehicle being lubricated and means for forcing the waste oil from storage when desired.

Related objects and advantages of the present invention will be apparent from the following description.

BRIEF DESCRIPTION OF THE DRAWING

FIG. 7 is a schematic representation of the hydraulic and pneumatic lines connected to the tanks in the system of FIG. 1.

FIG. 8 is a perspective top view of a waste oil receiver shown withdrawn from the van truck and connected to the waste oil hose 72.

FIG. 9 is a cross sectional view of the left rear door shown in FIG. 4 with desk 155 in the operable position.

DESCRIPTION OF THE PREFERRED EMBODIMENT

Figure 1:
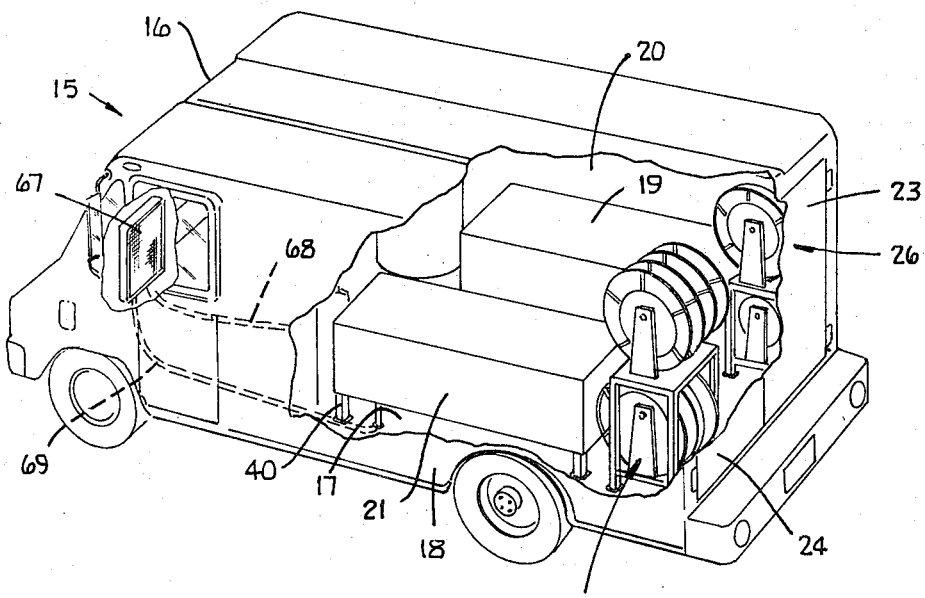
FIG. 1 is a fragmentary perspective view of a van truck incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a mobile lubrication apparatus 15 with a conventional van truck 16 having a driver compartment as well as a rear compartment wherein two bays of tanks 19 and 21 are mounted within the van atop rear platform 17. Bay 21 of the tanks extends along side wall 18 of the truck which is fragmented for the sake of clarity. Likewise, bay 19 of the tanks extends along and adjacent to side wall 20 of the truck. The tank bays 19 and 21 are spaced apart a distance 22 (FIG. 2) forming a walkway and storage area therebetween allowing a person to walk between the tanks from the driver compartment toward the back doors 23 and 24 which are hingedly mounted to the truck. The tanks are mounted to platform 17 by a plurality of legs 40.

Two hose assemblies 25 and 26 are mounted to platform 17 respectively adjacent tank rows 21 and 19. The hose assemblies are spaced apart and are in line with the respective tank rows with the storage area and walkway extending between the hose assemblies. Each of the hose assemblies has a pair of upper reels and a pair of lower reels rotatably mounted to the frame of a wheel assembly. Each reel has a hose wrapped thereon which is extendable through the rear of the truck to another vehicle to be lubricated.

Figure 2:
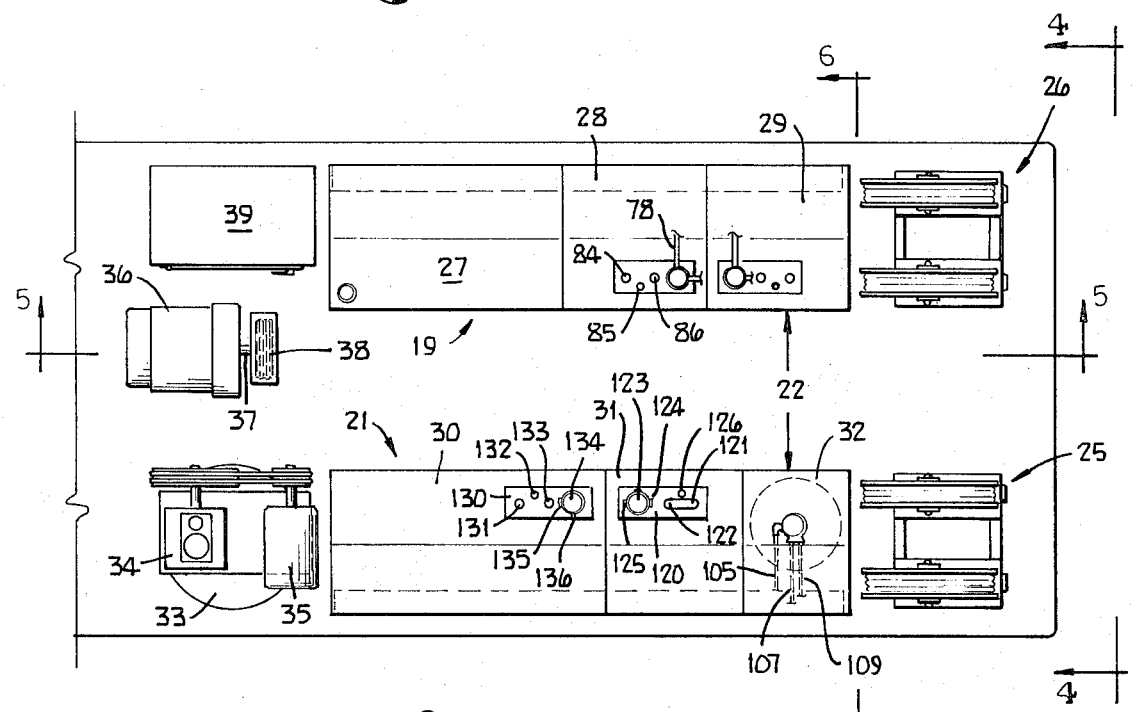
FIG. 2 is a partial floor plan of the truck of FIG. 1.

Referring to FIG. 2, there is shown a floor plan of the rear portion of the truck van. The tanks in bays 19 and 21 are made from 12-gauge corrosion resistant steel and are welded together to form the bays. Bay 19 has three separate compartments forming a water tank 27, a first motor oil tank 28, and a second motor oil tank 29. Tank bay 21 also has three separate tanks forming waste oil tank 30, transmission oil tank 31 and chassis lubrication tank cabinet 32. The various fluids within the aforementioned tanks are forced into or out of the tanks by pumps operated by pressurized air. An air storage tank 33 is mounted to the truck platform adjacent waste oil tank 30. An air compressor 34 and a 5-horsepower electrical motor 35 are mounted atop the air storage tank 33. The storage tank has an 80 gallon liquid capacity and is connected to the various pumps mounted atop the other tanks for conveying the pressurized air resulting from operation of motor 35 and compressor 34.

An electrical generator 36 coupled to the transmission of the truck, such as shown in our U.S. Pat. No. 3,685,535, provides the electrical energy required for motor 35 and for other electrical devices. The input drive shaft 37 of generator 36 is connected by a pulley-belt combination 38 to the drive shaft 30' engageable with the truck transmission. Such a generator with the required coupling gears is produced by the Generator ONAN Division of the Studebaker Corporation of Minneapolis, Minnesota under Model No. 10UP-4X/1A. With the truck in a stationary position and with the engine running, the transmission may be put into gear so as to drive generator 36. The electrical energy provided by the generator may be utilized to power motors, pumps as well as various air heaters and lights in the truck.

Hose assemblies 25 and 26 are identically structured and therefore the following description relative to hose assembly 26 will apply also to hose assembly 25. Hose assembly 26 (FIG. 5) has a frame 50 with vertically upstanding posts 51 fixedly mounted atop platform 17. Crossbars 52 extend across each side of the hose assembly being secured to posts 51 by welding or other suitable means. Bars 52 are spaced above platform 17 approximately a distance of one foot allowing for the storage of suction hose 79. A platform 53 is mounted atop the upper ends of posts 51 allowing the upper two reels to be mounted thereon. Crossbars 52 are interconnected formign a lower platform upon which four mounting walls 54 (FIGS. 4 and 5) are secured thereon. Reel 56 is rotatably mounted between two of the mounting walls 54 with a second reel 57 being rotatably mounted between the remaining two mounting walls 54. Each reel is fixedly mounted on a separate spindle 55 which is rotatably received by suitable bearings provided in walls 54. Hoses 58 and 59 are respectively wrapped on reels 56 and 57. The two upper reels 62 and 63 (FIG. 4) are fixedly mounted to spindles 61 and 61' which are rotatably received in bearings provided in the top mounting walls 60 which in turn are mounted atop platform 53. Hoses 64 and 65 are respectively wrapped on reels 62 and 63.

Hose assembly 25 has a pair of lower and upper reels 71 rotatably mounted thereon. The lower reels have hoses 74 and 75 wrapped thereon whereas the upper pair of reels have hoses 72 and 73 wrapped thereon. The free ends of the hoses are extendable from the truck passing through retainer plates 76 (FIG. 3) mounted to the hose assemblies adjacent each reel. The hoses are freely extendable through plates 76; however, the free end of each hose has an enlarged portion such as a handle or control which will not pass through the retainer. As a result, the reels may be wound until the free ends of the hoses are positioned adjacent retainer plates 76. The retainer plates are provided with a hole larger than the diameter of the hose but not sufficiently large so as to allow the enlarged hose end to pass therethrough. Suitable needle bearings may be mounted to the retainer plates around the holes receiving the hoses providing for relatively frictionless movement of the hoses. The ends of the hoses adjacent the drum of each reel are connected to the tank lines by conventional rotatable couplings.

Tank 27 (FIG. 5) serves as a storage container for water and anti-freeze. Baffles are mounted within tank 27 preventing violent movement of the fluid contained within the tank during truck movement. In one embodiment, tank 27 has a capacity of 98 gallons. A 3/4 inch suction pipe 42 extends sealingly out of tank 27 and is connected to hose 44 by coupling 43. An electric water pump 45 mounted above tank 27 to the side wall of the truck is operatively connected to hose 44 so as to withdraw fluid from tank 27 and out through the pump outlet tube 46. The pump outlet tube 46 is fastened to and extends rearwardly with side wall 20 of the truck. Tube 46 is connected by a conventional reel rotatable coupling to hose 65. A suitable meter and valve (not shown) are provided on tube 46 so as to measure and control the flow of fluid to the water outlet hose 65. A schematic representation of the connection between the various hoses and tanks is shown in FIG. 7. A water surge tank 47 mounted to the truck side wall is connected to the pump outlet tube 46 by a T coupling 48. Tank 47 has a capacity of one-half gallon maintaining a constant pressure on the outwardly flowing fluid. A variety of water pumps may be used for pump 45; however, excellent results have been obtained by using a one-third horsepower pump.

Tanks 28 and 29 are identical in size and are used to store motor oil. Each tank 28 and 29 has a capacity of 60 gallons with one tank being used for a motor oil of a different viscosity than the motor oil in the adjacent tank. A pair of air-operated fluid pumps 88 and 92 are mounted respectively atop plates 82 and 93 of tanks 28 and 29. The inlet pipes of the pumps extend downwardly into the tanks opening atop the tank plates. For example, pump 88 has an inlet pipe 87 (FIG. 5) which extends downwardly into tank 28 and then upwardly being connected to plate 82. Tank 28 has an outlet pipe 83 which extends sealingly through and is mounted to plate 82. A similar tank outlet pipe is provided for tank 29 and is connected to plate 93. To pump oil from tank 28, a short length of tubing is connected to and between the outlets of pipes 83 and 87. Thus, activation of pump 88 will result in oil being sucked from tank 28 out through pipe 83 and into pipe 87. The fluid outlet 89 of pump 88 is connected by pipe 99 (FIG. 7) to hose 59. Likewise, the outlet 94 of pump 92 is connected to hose 58. To fill tanks 28 and 29, a threaded plug is removed from the inlet opening of plates 82 and 93. For example, plug 85 may be removed from plate 82 allowing oil to be poured or forced into tank 28. Each air-operated pump 88 and 92 has an air inlet connected respectively to air hoses 78 and 95 (FIG. 7) which in turn are connected through meter 97 and valve 96 to the compressed air storage tank 33.

The oils provided by tanks 28 and 29 are used to fill the engine oil compartment of the vehicle being serviced. In many cases, the owner of the serviced vehicle will instead desire to have his vehicle filled with his own specific type of oil. In this case, an oil suction hose 79 which is positioned beneath hose assembly 26 is connected directly to the inlet pipe of one of the air-operated suction pumps. For example, the hose connecting pipes 83 and 87 may be removed from couplings 84 and 86 with one end of hose 79 connected directly to coupling 86. The opposite end of hose 79 may then be pulled outwardly from the truck and positioned within the customer's oil storage barrel. Operation of pump 88 will then result in the withdrawal of the oil from the customer's storage area through the pump and out to the vehicle being serviced through hose 59. The free end of suction hose 79 is rigid, being provided with a straight length of steel pipe so as to allow the free end of the suction hose to be positioned within a container such as a barrel. The extra weight of the steel end will prevent the accidental disengagement of the suction hose from the barrel caused by the weight of the suction hose. The suction hose is positioned in storage area 91 (FIG. 4) beneath hose assembly 26; however, it is understood that the suction hose could also be mounted to a rotatably mounted reel in a manner similar to that of the other hoses.

The air operated pumps as well as the reels may be purchased from Stewart Warner Alemite Sales Co., Inc., 2951 North Webster Avenue, Indianapolis, Indiana. The pump model number is 8568A. Likewise, the oil meters 100 (FIG. 7) and the gauge 81 (FIG. 5) for tank 27 may be purchased from Steward Warner Alemite Sales Co., Inc. The oil meters 100 are connected to pipes 98 and 99 within the truck at a suitable location so as to allow for the measurement of the oil withdrawn from the storage tanks or from the customer's storage barrel. Gauge 81 measures the amount of antifreeze within the water contained in the tank so as to allow the determination of the freezing point of the liquid within the tank. Cap 80 is removably sealed to a pipe communicating with the interior of tank 27 allowing for the insertion of water and anti-freeze.

Figure 6:
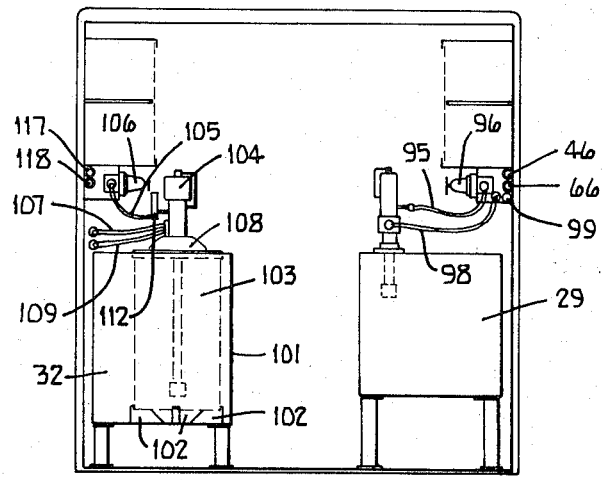
FIG. 6 is a rear view of the tank bays looking in the direction of arrows 6—6 of FIG. 2.

Tank bay 21 (FIG. 2) has a waste oil storage tank 30 and transmission oil storage tank 31. The third compartment of tank bay 21 is a chassis lubrication storage cabinet 32 having a door 101 (FIG. 6) hingedly mounted thereto which swings into the walkway between the rows. To replace an expended lubrication drum 103, the chassis lubrication drum cover 108 is removed from the cabinet. Standard wing nuts and fastening devices (not shown) are used to secure the cover 108 to the cabinet. Mounted atop drum cover 108 is an air actuated pump 104 for forcing the grease within drum 103 to a pair of hoses mounted adjacent to the cabinet. Upon removal of the chassis lubrication drum cover, the expended drum 103 may be removed from the cabinet by pulling the drum outward into the walkway through the opening normally closed by door 101. Three wedge-shaped drum blocks 102 rest atop the bottom wall of the cabinet with the block adjacent to door 101 being removable from the cabinet. After the removal of the expended drum, a new drum may be inserted into the cabinet and the wedge support block 102, normally adjacent the door, may then be slid underneath the drum and the door 101 closed. The chassis lubrication drum cover 108 is then reinstalled on the cabinet. Such a chassis lubrication drum cover with associated air actuated air pump is available from the Stewart Warner Alemite Sales Co., Inc. under model number 8540. Pump 104 is operatively connected by air line 105 through meter 112 and regulator 106 (FIG. 7) to the compressed air storage container 33. Pump 104 has a pair of outlets connected via hoses 107 and 109 respectively to chassis lubrication hoses 74 and 75. Thus, two vehicles may be serviced at a time since two chassis lubrication hoses are provided. Alternatively, the two chassis lubrication hoses may be used to simultaneously service different components of the same vehicle.

Storage tank 31 is used to store transmission oil and is provided with an air-actuated fluid pump 123 mounted atop plate 120 in a manner identical to the fluid pump and plates of tanks 28 and 29 previously disclosed. The tank outlet 121 is connected to the pump inlet pipe 122 whereas the pump outlet 124 is connected via hose 117 to hose 73 (FIG. 7). The air inlet 125 of pump 123 is connected through meter 114 and valve 113 (FIG. 7) to the compressed air storage tank. Plug 126 sealingly and removably closes an opening in tank 31 so as to allow for the insertion of new transmission oil when the tank is empty.

Valve 115 and gauge 116 (FIG. 7) are connected to air line 136 for controlling the operation of pump 134 connected to hose 72 by pipe 118. Hose 72 is connected to waste oil receiver 140 (FIG. 8). Receiver 140 is a generally rectangular-shaped container having an open top with a screen 142 extending thereacross. The bottom wall 145 of the container slopes downwardly toward end 143 to coupling 144 connected to hose 72. Thus, the oil received by container 140 will flow downwardly through coupling 144 and into waste oil suction hose 72. A plurality of wheels 141 are rotatably mounted to the bottom ends of the legs fastened to receiver 140. Thus, container 140 may be rolled beneath the vehicle being serviced to catch the oil which may be drained from the vehicle crankcase. Container 140 may be uncoupled from hose 72 and stored in a suitable location within the truck when not in use. Pump 134 (FIG. 7) is identical to the air-actuated pump previously disclosed and is operable to suck the waste oil from receiver 140. Pump 134 is mounted to plate 130 affixed to tank 30. Plate 130 (FIG. 2) is identical to plates 120 and 82 having a plug 132 sealingly closing a tank opening and being removable to facilitate access to the interior of the tank. A pipe 131 extends downwardly into the container and is connected by a short length of tubing to the pump outlet 133 when it is desired to suck oil into the tank. The pump inlet 135 is connected via hose 118 to suction hose 72. The air inlet line 136 of pump 134 is connected to the pressurized air container 33 via a standard air line. When it is desirable to empty tank 30, pipe 131 is connected to the pump inlet 135 with the pump outlet 133 being connected to hose 72.

Figure 4:
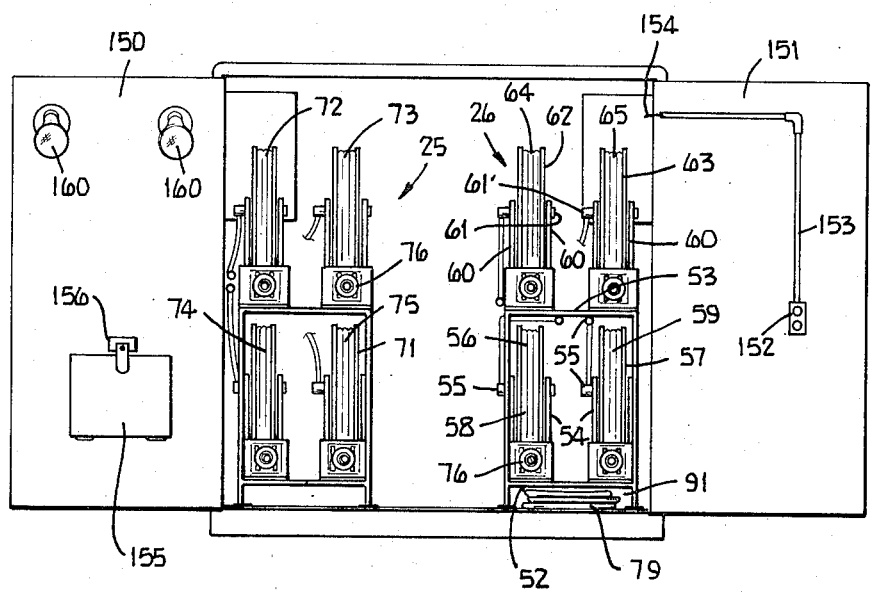
FIG. 4 is a rear view of the truck looking in the direction of arrows 4—4 of FIG. 2 with the rear doors shown in the open position.
Figure 5:
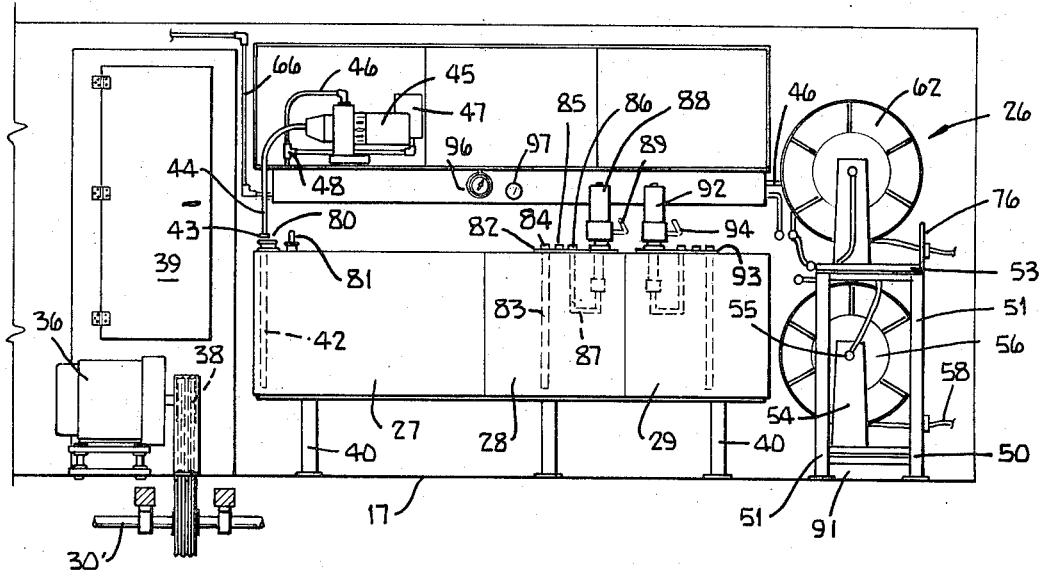
FIG. 5 is a side view of tank bay 19 looking in the direction of arrows 5—5 of FIG. 2.

Suitable storage cabinets are mounted within the truck for the storage of various items. For example, storage cabinet 39 is positioned adjacent tank 27 and generator 36 being secured to the side wall of the truck. A fold-away desk 155 is hingedly mounted to rear door 150 (FIGS. 4 and 9). The desk is connected to the door by hinges 159 and is foldable to a vertical stored position being secured to the door by a latch 156. Latch 156 has a pair of bars 157 and 158 with bar 157 being fixedly connected to the door and with bar 158 being rotatably mounted thereto to engage the swinging portion of the desk. A plurality of spotlights 160 are mounted to doors 150 and 151 being operatively connected to the electrical generator. A power outlet box 152 is secured to door 151 with the electrical conduits to the power outlet box extending through pipe 153 mounted to the door. The electrical conduits 154 are then routed to the electrical generator.

Figure 3:
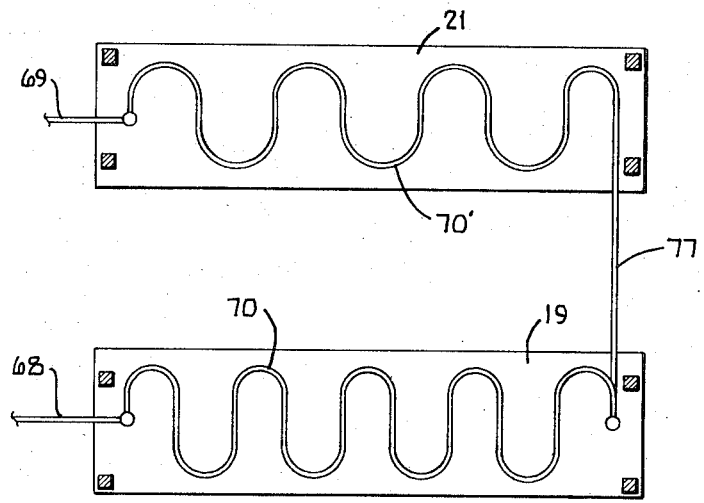
FIG. 3 is a fragmentary bottom view of tank bays 19 and 21 shown in FIG. 1.

FIG. 3 is a bottom view of tank bays 19 and 21. The serpentine pipe 70 is welded to the bottom wall of the tanks and is connected to a similar serpentine pipe 70' by interconnecting pipe 77. An inlet pipe 68 connected to pipe 70 is connected to the radiator 67 (FIG. 1) of the truck. Thus, heated fluid from radiator 67 will flow through pipes 68, 70, 77 and 70' and then back to the radiator via pipe 69. As a result, the bottom wall of all of the tanks is heated so as to maintain a constant viscosity of the fluids contained within the tanks during winter time operation.

A hose 64 (FIG. 7) is connected to pressurized air container 33 via pipe 66. Thus, the tires of the vehicle being serviced may be filled with air via hose 64.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. The mobile lubrication system combination of:
a truck;
a first row of storage tanks mounted to said truck and extending along one side thereof, one of said tanks having an outlet tube;
a second row of storage tanks mounted to said truck and extending along the opposite side thereof and being spaced from said first row of tanks with a storage area and walkway therebetween;
a first reel assembly mounted to said truck and having a plurality of reels rotatably mounted thereon;

a first hose mounted to a reel of said assembly and being extendable from said truck;
a suction hose extendable from said truck;
a fluid pump mounted to said truck and having an outlet connected to said first hose and an inlet removably connected to said suction hose for said pump to force fluid from said suction hose and out of said first hose, said pump inlet being connectable to said tank outlet tube when said pump is not connected to said suction hose so as to force fluid from said tank outlet tube out said first hose;
a second hose connected to a tank in said second row tanks and being extendable from said truck;
air pressure means mounted in said truck operable to provide air under pressure to said first pump;
an electrical generator mounted in said truck and being operably driven by the transmission of said truck and providing electrical energy to said air pressure means; and,
an air hose connected to said means and mounted on one of said reels of said first assembly, said air hose being extendable from said truck;
all of said tanks have bottom walls spaced apart from said platform for storage purposes and further comprising:
a serpentine-shaped pipe fixedly mounted directly to and in contact with said bottom walls, said pipe being connected to the radiator of said truck receiving heated fluid to heat the bottom walls of said tank;
said serpentine-shaped pipe is positioned externally of said tank to simultaneously heat said tanks and the storage spaces thereunder.

2. In a truck the combination of a first row of tanks and a second row of tanks with each row extending along a side of said truck, said first row is spaced apart from said second row forming a walkway therebetween, wherein the improvement comprises:
electrical generator means mounted to said truck and operably driven by the transmission of said truck, air pressure means mounted to said truck and operably connected to said electrical generator means, liquid pump means mounted to said truck and operably driven by said air pressure means;
a first suction hose connected to said pump means being extendable from said truck;
a first outlet hose extendable from said truck and connected to said pump means to receive liquid from said first suction hose;
a waste oil receiver extendable from said truck and connected to said pump means and to one of said tanks in said first row, said pump means being operable to force waste oil from said receiver; and,
a plurality of hoses connected to tanks in said first row and said second row and being extendable from said truck, said pump means being connected to said plurality of hoses to force liquid from said tanks connected to said plurality of hoses;
said truck has a platform supporting said tanks, all of said tanks have bottom walls spaced apart from said platform for storage purposes and further comprising:
a serpentine-shaped pipe fixedly mounted directly to and in contact with said bottom walls, said pipe being connected to the radiator of said truck receiving heated fluid to heat the bottom walls of said tank;
said serpentine-shaped pipe is positioned externally of said tank to simultaneously heat said tanks and the storage spaces thereunder.

* * * * *